United States Patent
Das et al.

(10) Patent No.: US 11,496,045 B2
(45) Date of Patent: Nov. 8, 2022

(54) MULTI-OUTPUT HYBRID CONVERTERS

(71) Applicant: The Regents of the University of Colorado, a body corporate, Denver, CO (US)

(72) Inventors: Ratul Das, Boulder, CO (US); Hanh-Phuc Le, Superior, CO (US)

(73) Assignee: THE REGENTS OF THE UNIVERSITY OF COLORADO, A BODY CORPORATE, Denver, CO (US)

( * ) Notice: Subject to any disclaimer, the term of this patent is extended or adjusted under 35 U.S.C. 154(b) by 0 days.

(21) Appl. No.: 16/538,796

(22) Filed: Aug. 12, 2019

(65) Prior Publication Data

US 2020/0212807 A1 Jul. 2, 2020

Related U.S. Application Data

(60) Provisional application No. 62/717,577, filed on Aug. 10, 2018, provisional application No. 62/717,574, filed on Aug. 10, 2018, provisional application No. 62/717,572, filed on Aug. 10, 2018.

(51) Int. Cl.
| | |
|---|---|
| *H02M 3/07* | (2006.01) |
| *H02M 3/158* | (2006.01) |
| *H02M 3/28* | (2006.01) |
| *H02M 1/00* | (2006.01) |

(52) U.S. Cl.
CPC ............ *H02M 3/07* (2013.01); *H02M 3/158* (2013.01); *H02M 3/285* (2013.01); *H02M 1/009* (2021.05)

(58) Field of Classification Search
CPC ..................................................... H02M 3/07
See application file for complete search history.

(56) References Cited

U.S. PATENT DOCUMENTS

| | | | | |
|---|---|---|---|---|
| 7,696,735 | B2 * | 4/2010 | Oraw ..................... | H02M 3/07 |
| | | | | 323/282 |
| 9,853,460 | B2 * | 12/2017 | Ichikawa .......... | H02M 3/33584 |
| 10,547,241 | B1 | 1/2020 | Li et al. | |
| 10,554,141 | B2 | 2/2020 | Dai et al. | |
| 10,756,623 | B1 | 8/2020 | Petersen | |

(Continued)

OTHER PUBLICATIONS

"United States Data Center Energy Usage Report" by Arman Shehab et al. published Jun. 2016.

(Continued)

*Primary Examiner* — Adi Amrany
(74) *Attorney, Agent, or Firm* — Workman Nydegger

(57) ABSTRACT

The present disclosure provides methods and circuits of multi-output hybrid voltage regulators that generate multiple lower level DC voltages lower than the magnitude of an input voltage provided to an input node of the regulator. The disclosed methods and circuits can be applied to today's Large conversion ratio DC-DC converters that allow them to support same power conversion functionality for multiple output voltages with one core switched capacitor network sharing passive components and switches with less voltage ratings, and therefore, reduce the implementation space to save cost as well as improve efficiency. Sample applications include, but are not limited to, PoL converters for data centers and telecommunication systems with better efficiency and compactness for higher conversion ratio.

5 Claims, 16 Drawing Sheets

(56) References Cited

U.S. PATENT DOCUMENTS

| | | | | |
|---|---|---|---|---|
| 10,879,801 | B2* | 12/2020 | Zhang | H02M 3/1584 |
| 2008/0239772 | A1* | 10/2008 | Oraw | H02M 3/07 |
| | | | | 363/60 |
| 2013/0234669 | A1 | 9/2013 | Huang et al. | |
| 2014/0306673 | A1 | 10/2014 | Le et al. | |
| 2015/0022173 | A1 | 1/2015 | Le et al. | |
| 2018/0358896 | A1 | 12/2018 | Puggelli | |
| 2019/0190368 | A1* | 6/2019 | Rainer | H02M 3/07 |
| 2019/0348913 | A1* | 11/2019 | Zhang | H02M 3/07 |
| 2020/0212795 | A1* | 7/2020 | Das | H02M 3/158 |
| 2020/0350817 | A1* | 11/2020 | De | H02M 3/07 |

OTHER PUBLICATIONS

Final Office Action received for U.S. Appl. No. 16/538,816, dated Dec. 31, 2020, 18 pages.

J. F. Dickson, "On-chip high-voltage generation in MNOS integrated circuits using an improved voltage multiplier technique," in IEEE Journal of Solid-State Circuits, vol. 11, No. 3, pp. 374-378, Jun. 1976, doi: 10.1109/JSSC.1976.1050739.

J. S. Rentmeister and J. T. Stauth, "A 48V:2V flying capacitor multilevel converter using current-limit control for flying capacitor balance," 2017 IEEE Applied Power Electronics Conference and Exposition (APEC), Tampa, FL, 2017, pp. 367-372, doi: 10.1109/APEC.2017.7930719.

M. H. Ahmed, C. Fei, F. C. Lee and Q. Li, "48-V Voltage Regulator Module With PCS Winding Matrix Transformer for Future Data Centers," in IEEE Transactions on Industrial Electronics, vol. 64, No. 12, pp. 9302-9310, Dec. 2017, doi: 10.1109/TIE.2017.2711519.

W. Liu, P. Assem, Y. Lei, P. K. Hanumolu and R. Pilawa-Podgurski, "10.3 A 94.2%-peak-efficiency 1.53A direct-battery-hook-up hybrid Dickson switched-capacitor DC-DC converter with wide continuous conversion ratio in 65nm CMOS," 2017 IEEE International Solid-State Circuits Conference (ISSCC), San Francisco, CA, 2017, pp. 182-183, doi: 10.1109/ISSCC.2017.7870321.

Y. Lei, R. May and R. C. N. Pilawa-Podgurski, "Split-phase control: Achieving complete soft-charging operation of a dickson switched-capacitor converter," 2014 IEEE 15th Workshop on Control and Modeling for Power Electronics (COMPEL), Santander, 2014, pp. 1-7, doi: 10.1109/COMPEL.2014.6877145.

* cited by examiner

MULTI-OUTPUT HYBRID CONVERTERS

CROSS-REFERENCE TO RELATED APPLICATIONS

This application claims the benefit of U.S. provisional application no. 62/717,574 entitled "Hybrid Converter Family for Large Conversion Ratios and Methods Thereof" and filed Aug. 10, 2018; U.S. provisional application no. 62/717,572 entitled "Switched Capacitor Inverting Network for Large Conversion Ratio Converters and Method Thereof" and filed Aug. 10, 2018; and U.S. provisional application No. 62/717,577 entitled "Multi-Output Hybrid Converter and Method Thereof" and filed on Aug. 10, 2018, each of which is hereby incorporated by reference as though fully set forth herein. This application is also related to U.S. application Ser. No. 16/538,816 entitled "Hybrid Converter Family and Methods Thereof" and contemporaneously filed with this application on Aug. 12, 2019, which is also incorporated by reference as though fully set for the herein.

TECHNICAL FIELD

The present disclosure relates to hybrid voltage regulators that can support two or more output ports regulating different voltages at different ports.

BACKGROUND

Data center network around the world has become the backbone of online information whose traffic is estimated to triple from 4.7 ZB/year in 2015 to 15.3 ZB/year in 2020. To support storing and instantly providing information at customers' request, data center power consumption is expected to be ~73 billion kWh in 2020, equivalent of ~$7.3 billion cost of electricity, in the U.S. alone. These numbers could increase because of soaring demands for online data and cloud computing. It has become apparent that simply building similar data centers at the same growth rate with needed data traffic would not be desirable in both technical and economic terms. However, many data center companies have still been building data centers based on existing architectures with only local advanced improvements at sub-system levels to reduce implementation risk, and avoid more high-risk-high-reward approaches. The problems are that 1) the traditional power delivery accounts for ~15% of the total power consumption, i.e. ~11 billion kWh or $1.1 billion, is pure dissipation because of inefficiency in power conversion stages, and 2) replicating current data center setup would require the land spent for a data center to grow exponentially together with the amount of data that it needs to process. As the result, the cost of land for data centers would dominate and make the Total Cost of Ownership (TCO) prohibitively expensive. To this point, in order to grow data center capacity with maximized land utilization and minimized cost in hosting physical servers, new data centers need to have server rack units as small as possible to fit in smaller spaces to increase server and data density. This space limit, in turn, incurs a grand challenge of power distribution and thermal management in data center. Inefficient power distribution and management will guarantee the need for massive cooling efforts, leading to both additional area and power consumption caused by cooling devices, and inevitably higher cost.

New power distribution and management solutions can be used to address this challenge for future green data centers. Power delivery architectures can utilize new power converter topologies and digital control that efficiently delivers the power all the way from AC grid down to processor core voltage that are compact, scalable, highly-efficient, low-heat, low-cost, and reliable. New architectures, when successfully developed, will help reduce energy consumption, carbon footprint, cooling and water impact for data centers. The architectures, including new sub-system topologies and control, can also be applied to many other different IT systems, e.g. in automotive, communication stations, LED drivers, portable applications, etc., to achieve system compactness, high efficiency, scalability and low cost.

Reducing the number of conversion stages with efficient converter topologies and control can assist in AC grid-to-core power delivery architecture to achieve the above requirements, especially high efficiency and small size. Ideally, from the AC grid there should be only two power conversion stages, one AC-DC stage to rectify the input currents and one DC-DC converter stage to provide a regulated voltage for the loads. Since the loads, e.g. microprocessors in data centers, require a very high current at low voltage, e.g. 600 A at 1 V, the DC-DC converter is often placed as close to the loads as possible to reduce $I^2R$ conduction loss to convey the current from the DC-DC converter output to the loads. This converter is often referred as point-of-load (PoL) converter.

An important system consideration is to decide the bus voltage at the input of the PoL converter, i.e. output of the AC-DC stage. Traditionally, this PoL converter receives 12V bus voltage and provides ~1V output. As output power requirements increase rapidly, the input current distribution becomes a bottle neck in the whole system. For example, the 12V-to-1V conversion only reduces the input current by ~12 times, leading to a stress of distributing 50 A input current distribution for a 600 W load, or 100 A input current for 1.2 kW load. This high input current distribution can incur prohibitively high cost and complexity for board implementations. In addition, a low DC bus voltage imposes stress on the AC grid-to-DC bus to cover a large conversion ratio. To reduce the stress, this conversion stage is currently implemented using multiple stages with the cost of efficiency degradation.

Increasing the input voltage of the PoL converter stage can reduce its input current distribution and relax the AC grid-to-DC bus conversion ratio so that it can be efficiently implemented in a single stage. Started from Google, then HP, and Microsoft, prominent companies in data center infrastructure have initiated a new architecture where DC bus voltage is increased to nominally 48 V instead of 12 V. The uninterruptible power supply (UPS) energy storage is moved from a centralized location at high voltage to being distributed at the load rack level at 48 V using Li-ion batteries. The UPS distributed close to the loads enables faster response and load stability protection against both load and input surge transients. More importantly, it allows convenient and cost-effective modular scalability for both load and storage.

SUMMARY

To exploit all these benefits of the new power distribution system with high DC bus voltage, a PoL converter can support large conversion ratios, achieves both high efficiency and high-power density, i.e. requiring a small implementation space.

Some embodiments present DC-DC converters which take DC voltage at one node and provide multiple lower level DC voltages at other nodes.

Some embodiments include a network of switches and capacitors, which can block most of the input voltage and generate lower level voltages.

In some embodiments, switched capacitor networks operate in two phases.

In some embodiments, the switched capacitor inverting network can operate multiple phases.

The multi-phase operation of the switched capacitor network can be extended to any number of phases.

In some embodiments, presented switched capacitor inverting network can be extended to higher number of levels which can also result in higher number of output voltages supported by the regulators.

In some embodiments, presented switched networks can be reduced to simpler networks with less switches.

In some embodiments, the magnetic elements used in the presented regulators can be coupled together for better efficiency and compactness.

In some embodiments, lower level switches of the switched capacitor networks can be replaced with diodes.

In some embodiments, same switched capacitor network can be operated in multiple operation mode changing input to output conversion ratio.

In some embodiments, switches, capacitors, transformers etc. in the converters may have multiple configurations.

In some embodiments of a voltage regulator, the output voltages are determined based on the predetermined duty cycle, operating frequency, or specific timings of the power switches.

There has thus been outlined, rather broadly, example features in order that the detailed description that follows may be better understood, and in order that the present contribution to the art may be better appreciated. There are, of course, additional features of the disclosed subject matter that will be described hereinafter and which will form the subject matter of the claims appended hereto.

In this respect, before explaining at least one embodiment of the disclosed subject matter in detail, it is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, systems, methods and media for carrying out the several purposes of the disclosed subject matter. It is important, therefore, that the claims be regarded as including such equivalent constructions insofar as they do not depart from the spirit and scope of the disclosed subject matter.

These together with the other objects of the disclosed subject matter, along with the various example features of novelty which characterize the disclosed subject matter, are pointed out with particularity in the claims annexed to and forming a part of this disclosure. For a better understanding of the disclosed subject matter, its operating advantages and the specific objects attained by its uses, reference should be had to the accompanying drawings and descriptive matter in which there are illustrated preferred embodiments of the disclosed subject matter.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 5A shows an example embodiment of a two-phase version of a multi-output DC-DC converter using two transformers and synchronous rectification stages; FIG. 5B shows a three-phase version of a multi-output DC-DC converter using three transformers and synchronous rectification stages, and FIG. 5C shows a general N-phase version of a multi-output DC-DC converter using N transformers and N synchronous rectification stages.

FIG. 6A shows an example embodiment with two-inductor coupling of the multi-output hybrid converter using two inductors; FIG. 6B, shows an example embodiment with three-inductor coupling of the multi-output hybrid converter using three inductors; and FIG. 6C shows an example embodiment with a general N-inductor coupling version of the multi-output hybrid converter using N inductors.

DETAILED DESCRIPTION

Figure 1:
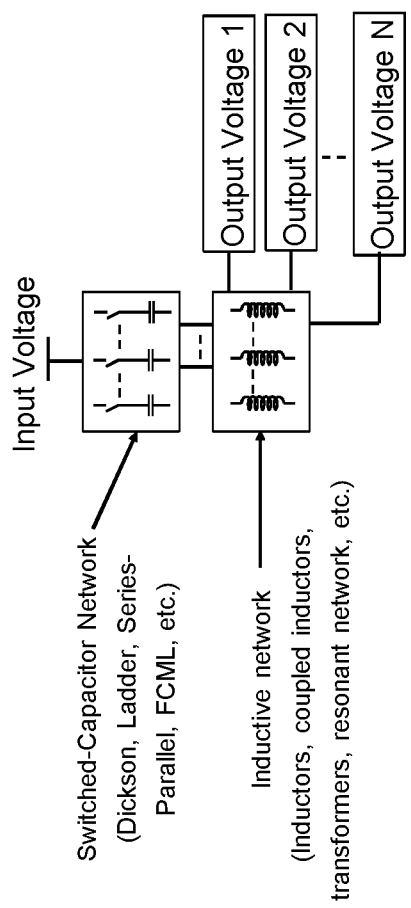
FIG. 1 is a schematic diagram of an example embodiment of a hybrid multi output DC-DC converter.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

With drastically increasing demands for cloud computing and big data processing, electric energy consumption of data centers in the U.S. is expected to reach 73 billion kWh by 2020, as reported in the 2016 report entitled "United States Data Center Energy Usage Report" by Arman Shehabi et al. at the Lawrence Berkeley National Laboratory. This power consumption accounts for ~10% of the U.S total electric energy consumption. A large portion of this consumption is caused by losses in inefficient power delivery architectures that require a lot of attentions and improvements. As the required distribution currents keep increasing for more demanding digital loads, the conventional 12-V bus architecture has exposed higher losses, complexity, and cost for interconnects in power delivery network. To address these issues, the 48-V bus architecture has emerged to be a new industry standard, employed by Google, HP and other prominent data center designers and users.

A key challenge in this architecture is the design of voltage regulator module (VRM) for the large conversion ratio from 48 V to core voltages, i.e. ~1-1.8 V that requires high-efficiency and high-power density for installations in the vicinity of processors. To deal with the challenges in the 48-V VRM, new ideas and improvements have been proposed and implemented. In a 2017 publication entitled "48-V Voltage Regulator Module With PCB Winding Matrix Transformer for Future Data Centers" on the IEEE Transactions on Industrial Electronics, Mohamed H. Ahmed et al. proposed a two stage 48-V VRM architecture using a 48-12-V LLC converter, which uses matrix transformer to achieve 850 W/in$^3$ power density, cascaded by 12-1.8-V multiphase buck converters. Although straightforward implementation is a benefit of this work, its efficiency is limited to 91% because of the two cascaded stage structure.

To overcome limited efficiency of a two-stage structure, hybrid converters bridge the large conversion ratio by efficient utilization of passive components. The 7-level flying capacitor multilevel (FCML) converter, reported in the conference paper entitled "A 48V:2V flying capacitor multilevel converter using current-limit control for flying capacitor balance," in 2017 IEEE Applied Power Electronics Conference and Exposition (APEC) by Jan S. Rentmeister and Jason T. Stauth, converts 48 V to 2 V using 12+1 switches, five flying capacitors, and one output inductor. While in N-level multilevel converters the inductor can be significantly reduced compared to a conventional Buck converter counterpart, it requires 2(N−1) switches, half of which experience the output current in operations, leading to large conduction losses in low-voltage high-current applications such as in data centers.

Another hybrid converter based on Dickson switched capacitor, reported by Yutian Lei et al. in the paper entitled "Split-Phase Control: Achieving Complete Soft-Charging Operation of a Dickson Switched-Capacitor Converter" in the IEEE Transactions on Power Electronics, Vol. 31 in January 2016, can be a potentially better candidate for the 48-V VRM thanks to reduced switch voltage and current stresses, and efficient charge delivery performance. The operation in this converter, however, only supports a fixed conversion ratio of 8-to-1. Particularly, it converts 150 VDC input to 18 VDC output without fine output voltage regulation. Using this converter would require another regulator in series to regulate the output voltage at different input voltage, leading to efficiency degradation. Wen-Chuen Liu et al. followed this architecture and added fine output regulation in the paper "A 94.2%-Peak-Efficiency 1.53 A Direct-Battery-Hook-Up Hybrid Dickson Switched-Capacitor DC-DC Converter with Wide Continuous Conversion Ratio in 65 nm CMOS" published at the 2017 International Solid-State Circuits Conference in San Francisco in February, 2017.

FIG. 1 is a schematic diagram showing an example embodiment of a multi-output hybrid DC-DC converter. In this embodiment, a high-level input voltage is provided to a network comprising a plurality of switches and capacitors, which blocks most of the input voltage and generates multiple switching voltages of different magnitudes. A plurality of inductors filter these switching voltages and generate multiple output voltages.

Figure 2A:
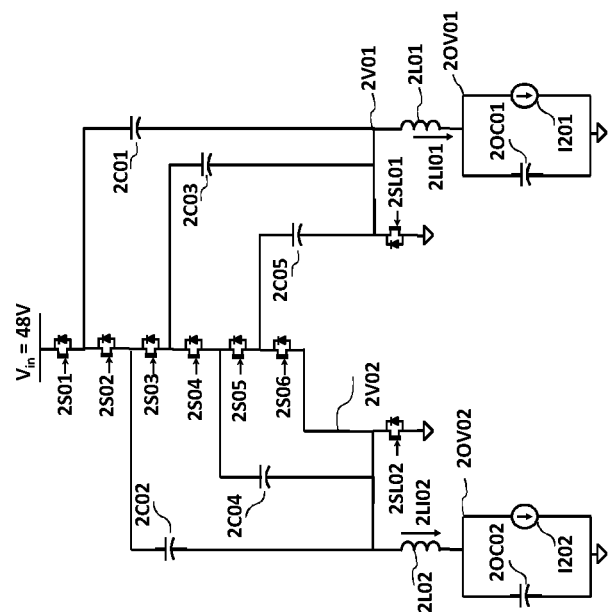
FIG. 2A is a schematic diagram of an example embodiment of a single-input, two-output hybrid converter.

FIG. 2A is a schematic diagram showing an example embodiment of a two-output DC-DC converter. In this particular implementation, the converter comprises six main network switches 2S01 to 2S06, two lower level switches and five lower level switches 2SL01 and 2SL02 which generate switching voltages at nodes 2V01 and 2V02. Two inductors 2L01 and 2L02 are connected with the switching nodes 2V01 and 2V02 respectively. These inductors in combination with output capacitors 2OC01 and 2OC02 respectively make two output filter filters that generate two output voltages at 2OV01 and 2OV02, respectively.

The switched capacitor network presented in the regulator shown in FIG. 2A, is a seven-level network, which generates close to one-sixth of the input voltage at switching nodes depending on the duty ratio of PWM signals for the main network switches of the network. The main network switches are driven by two phases of PWM signals with non-overlapping on time. The odd numbered switches in the main network 2S01,2S03 and 2S05 are driven by one PWM and the even numbered switches 2S02,2S04 and 2S06 are driven by another PWM signal. The lower level switches 2SL01 and 2SL02 are driven by the inverse of the PWM signals of the odd and even numbered switches respectively. The timing diagrams of these signals are shown in FIG. 2B.

Figure 2B:
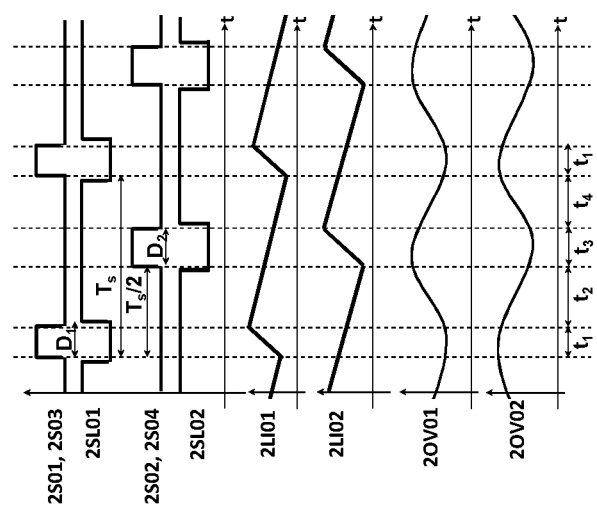
FIG. 2B is a graph showing example timing diagrams and wave shapes of inductor currents and output voltages of the converter shown in FIG. 2A.

In FIG. 2B, $t_1$ is the ON time of the PWM signals for the odd numbered switches 2S01 and 2S03 and $t_3$ is the ON time of the PWM signals for the even numbered switches 2S02 and 2S04. $t_2$ is the intermediate time between $t_1$ and $t_3$ and $t_4$ is the intermediate time between $t_3$ and $t_1$. During $t_1$ in every period, the switched capacitor network generates a DC pulse voltage at node 2V01. The switching voltage is filtered by an inductor 2L01 and capacitor 2OC01. The current of inductor 2L01 maintains the triangular wave shape with positive shape in $t_1$ just like a normal synchronous rectifier's inductor. The same phenomenon is true in the other side. Node 2V02 receives another pulse DC voltage in $t_2$ of every period which is then processed by the filter in combination of inductor 2L02 and 2OC02. After filtering two different voltages are generated at node 2OV01 and 2OV02. To control these output voltages, both the duty ratio of the two PWM signals for the main switched capacitor network switches are controlled.

Note that, it is not required that the PWM signals maintain exactly 180-degree phase between then them. A long as the ON times are not over-lapping, the regulator will function appropriately. It is also possible to drive the higher-level main network switches 2S01 to 2S06 to drive with six different PWM signals and relate the ON-OFF time of the lower level switches 2S01 and 2SL02 with them. In one embodiment, for example, that can be accomplished with symmetric distribution of the switching voltages seen by one individual inductor, or, with even distribution of the phases related to one individual inductor distributed over a period.

Figure 2C:
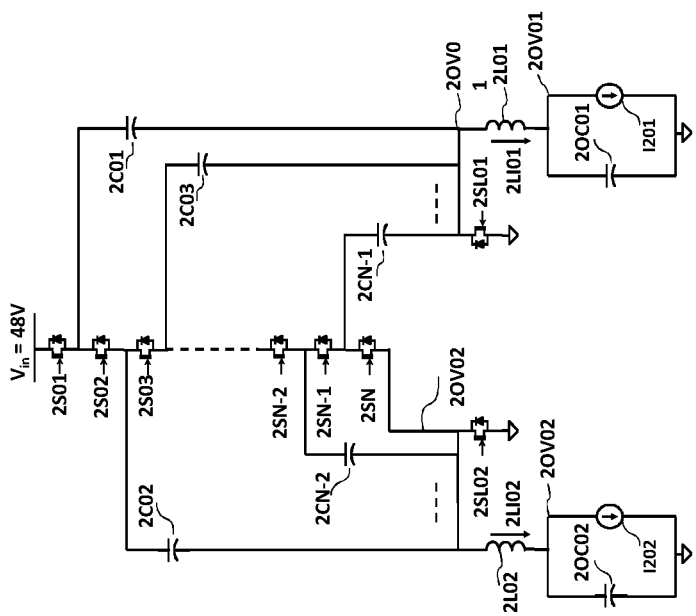
FIG. 2C shows a schematic diagram of an example embodiment of a multilevel extension of the converter shown in FIG. 2A.

FIG. 2C illustrates an example embodiment of a multi-level extension of the two-output converter shown in FIG. 2A. In this particular embodiment, a N+1 level extension of the converter topology is provided considering ground as one level, where N can be any number greater than or equal to two. The extended converter topology can have N number of higher-level main network switches 2S01 to 2SN and N−1 number of capacitors. The rest of the circuit is same as the regulator FIG. 2A. This converter circuit can also be operated with one pair of PWM signals and inverter versions.

Figure 3A:
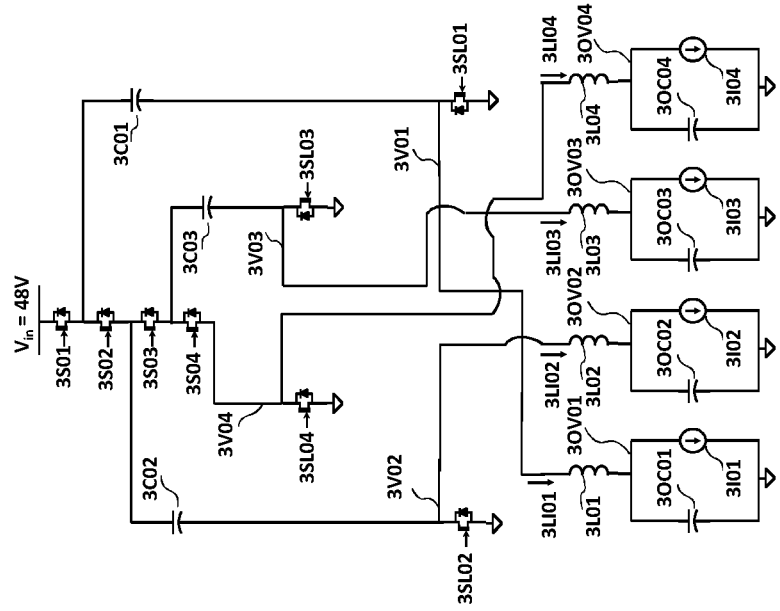
FIG. 3A is a schematic diagram of another example embodiment of a multi-output DC-DC converter that can support more than two output voltages, such as the four output voltages shown.

FIG. 3A shows another example embodiment of a multi-output hybrid converter which can support a plurality of outputs depending on the number of levels in the converter. This converter can also be reduced to the converter of FIG. 2.

Figure 3B:
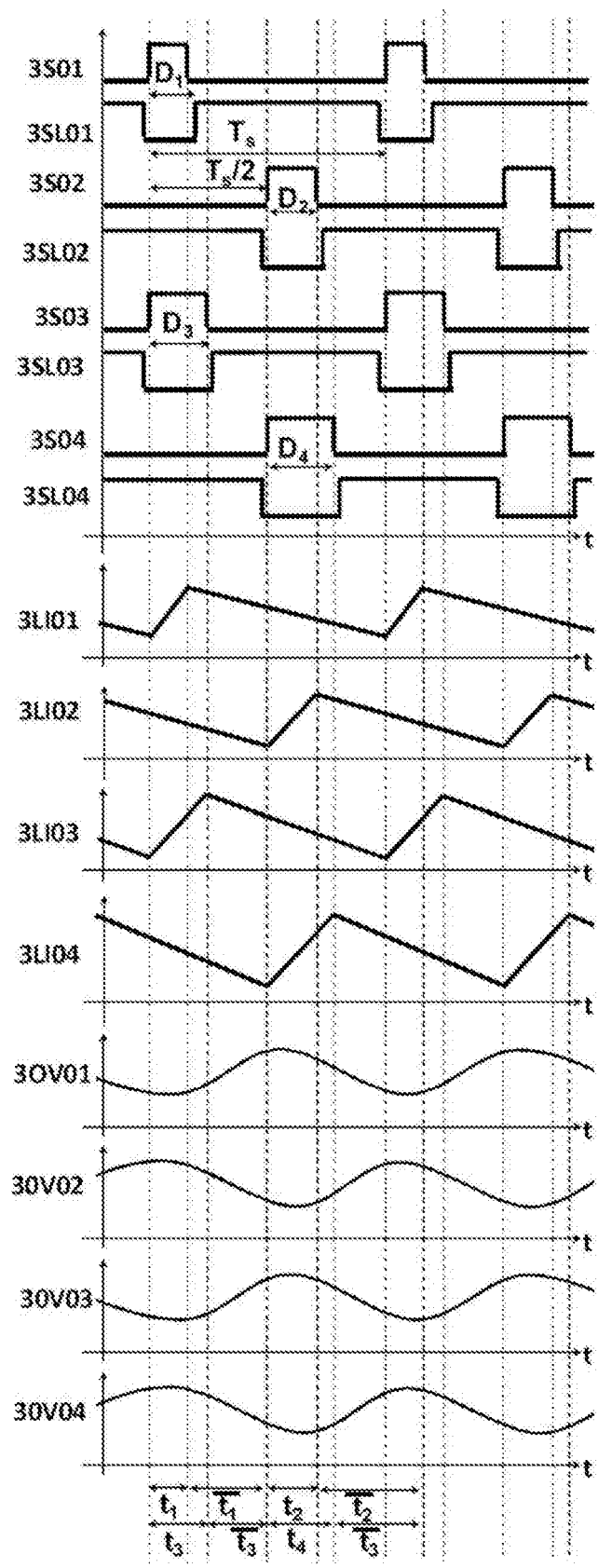
FIG. 3B is a graph showing example timing diagrams and wave shapes of the converter shown in FIG. 3A.
Figure 3C:
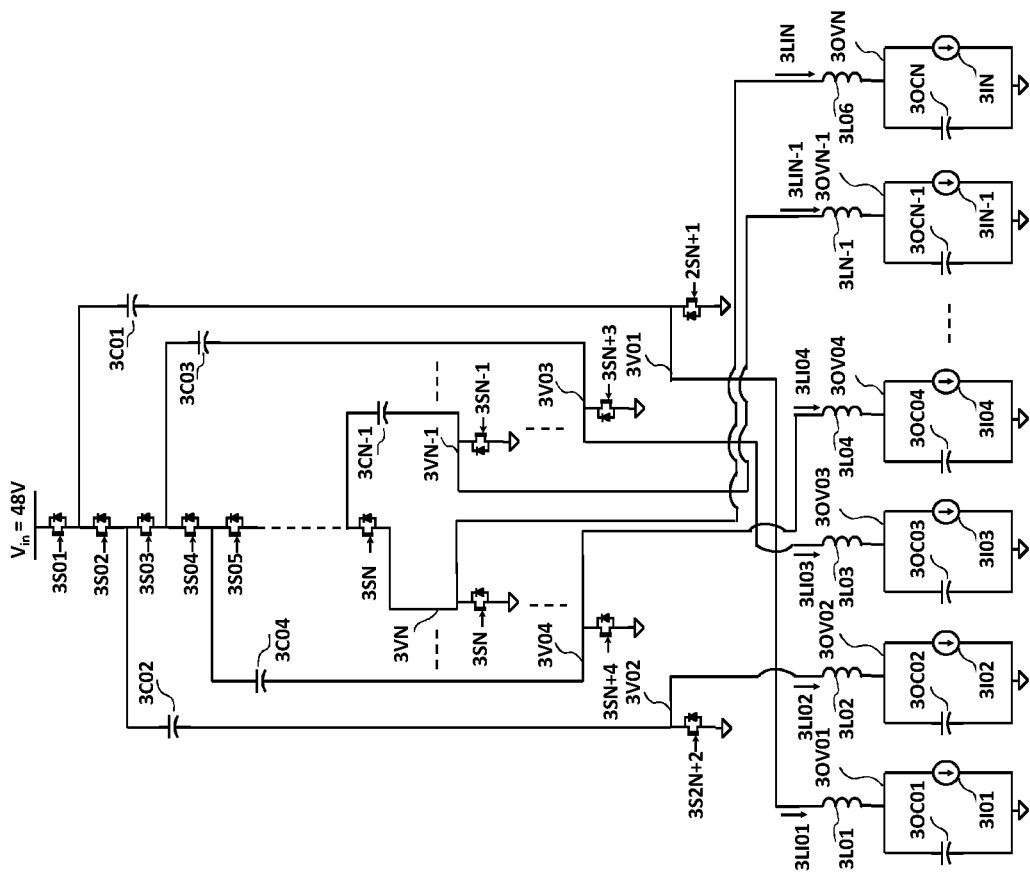
FIG. 3C is a schematic diagram of an example embodiment of a multilevel extension of the converter shown in FIG. 3A.

The regulators shown in FIG. 3A through 3C are different from the regulators shown in FIGS. 2A through 2C such that in the main switched capacitor network, all the capacitors' second terminals are different switching nodes and the capacitors drive separate output voltages. In FIG. 3A, for example, a five-level multi-output converter has four higher level main network switches 3S01 to 3S04, four lower level switches 3SL01 to 3SL04, three capacitors and four inductors, which in total can support four outputs. Example timing diagrams for this converter are shown in FIG. 3B. Like the converter shown in FIG. 2A, the converter shown in FIG. 3A provides one pair of PWM signals. The second terminals of the capacitors act as separate switching nodes. The four switching nodes 3V01 to 3V04 are connected with separate filters and separate output voltages. The converter architecture can regulate each of the four output voltages.

An example embodiment of a multi-level extension of this type of converter is also shown in FIG. 3C which includes an N+1 level embodiment considering ground as one level. In this particular embodiment, the converter can support up to N different output voltages. The constraints for operation are only that any two consecutive switches in the main switched capacitor cannot receive over-lapping ON time PWM signal. By controlling the duty-ratio of all the PWMs, each of the output voltages can be regulated separately.

Combining same type of switching nodes with same phases and adjusting their related switches' duty ratios, this converter can support fewer number of output voltages also. Doing this for all the switching nodes for two-phase operation, the converter can be reduced to the converter of FIG. 2C.

Figure 4A:
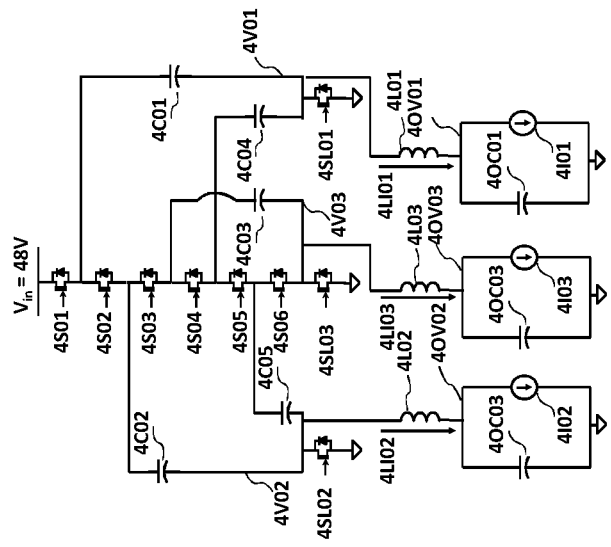
FIG. 4A is a schematic diagram of an example three-phase embodiment of a multi-output DC-DC converter.
Figure 4B:
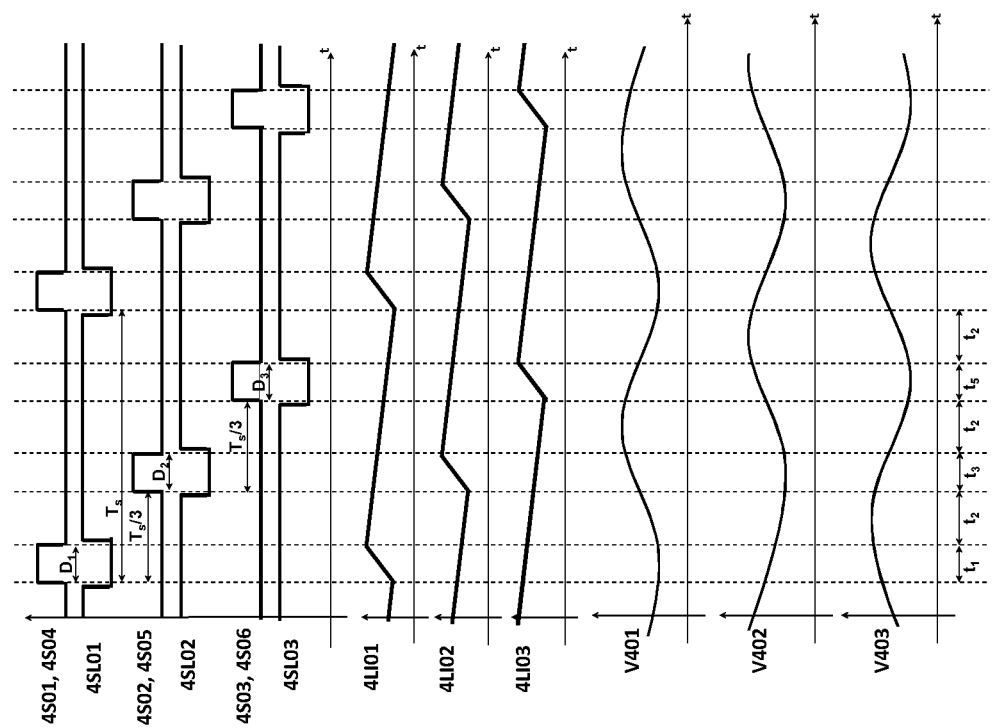
FIG. 4B is a graph showing example timing diagrams and wave shapes for the converter of FIG. 4A.
Figure 4C:
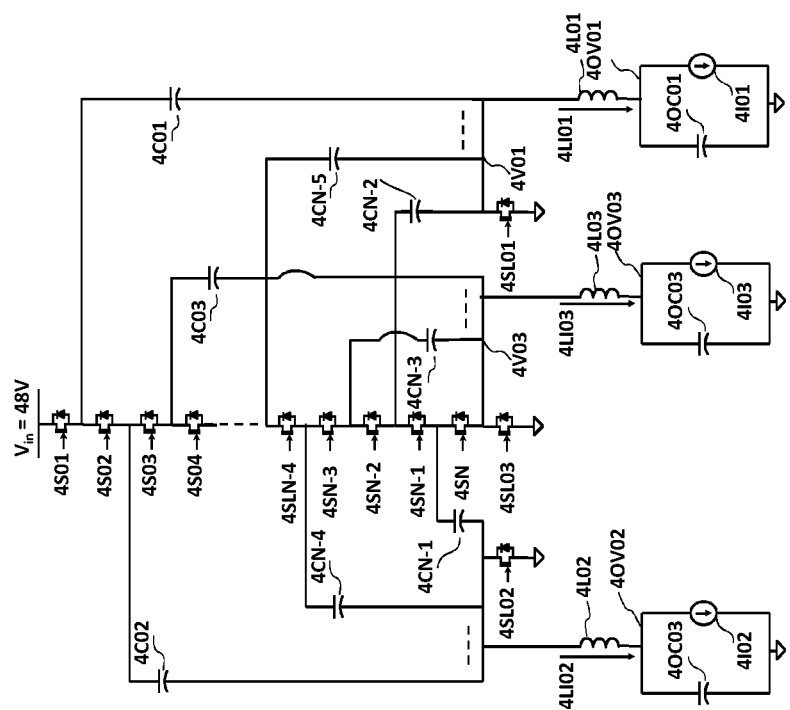
FIG. 4C is a schematic diagram of an example embodiment of a multilevel extension of three-phase multi-output converter shown in FIG. 4A.

FIG. 4A shows an example embodiment of a three-phase extension of the converter shown in FIG. 2A. The main networks switches in this embodiment are driven by three PWM signals over a period and their inverted signals. FIG. 4A and FIG. 4C, for example, show seven level and N+1 level illustrations of the converters considering ground as one level. As long as the two consecutive switches in the main switched capacitor network do not have over-lapping ON time, this converter will operate satisfactorily. FIG. 4B shows example timing diagrams and wave shapes for the converter of FIG. 4A. The operation of these types of multi-output converter can be extended to any number of phases.

Figure 5A:
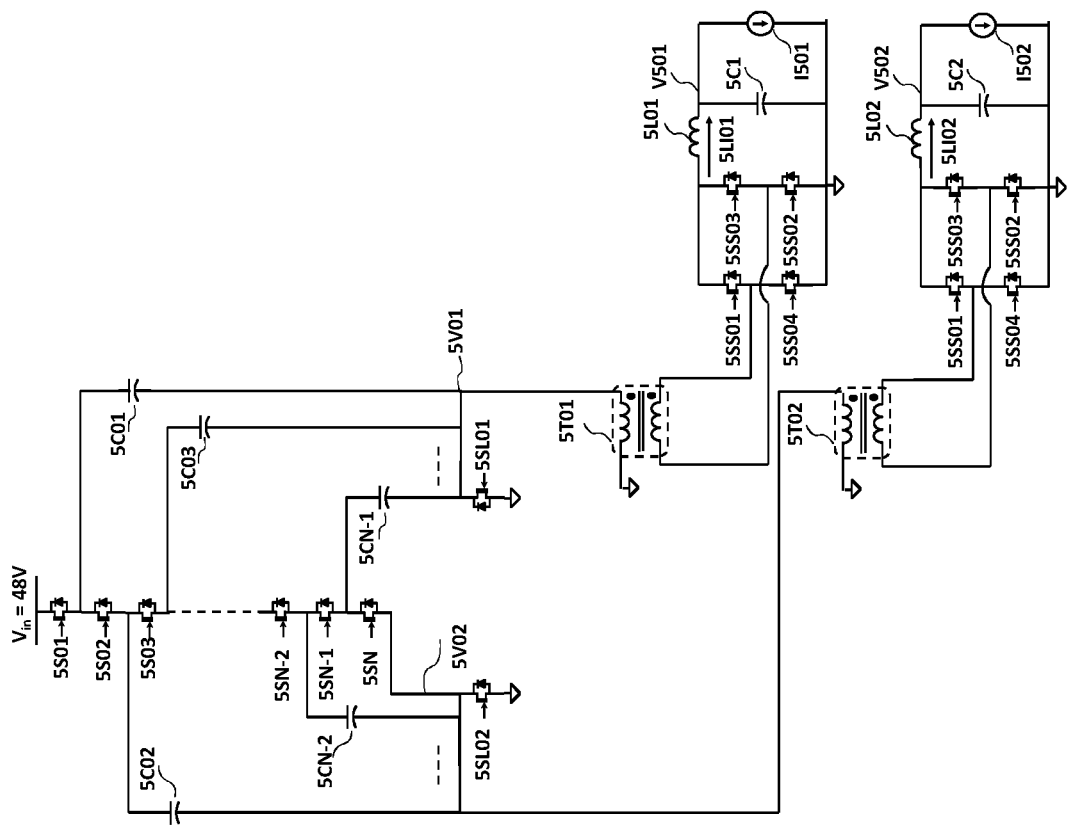
FIGS. 5A through 5C are schematic diagrams of example embodiments of a multi-output DC-DC converter where an inductive network is implemented using transformers followed by a synchronous rectifier stage.
Figure 5B:
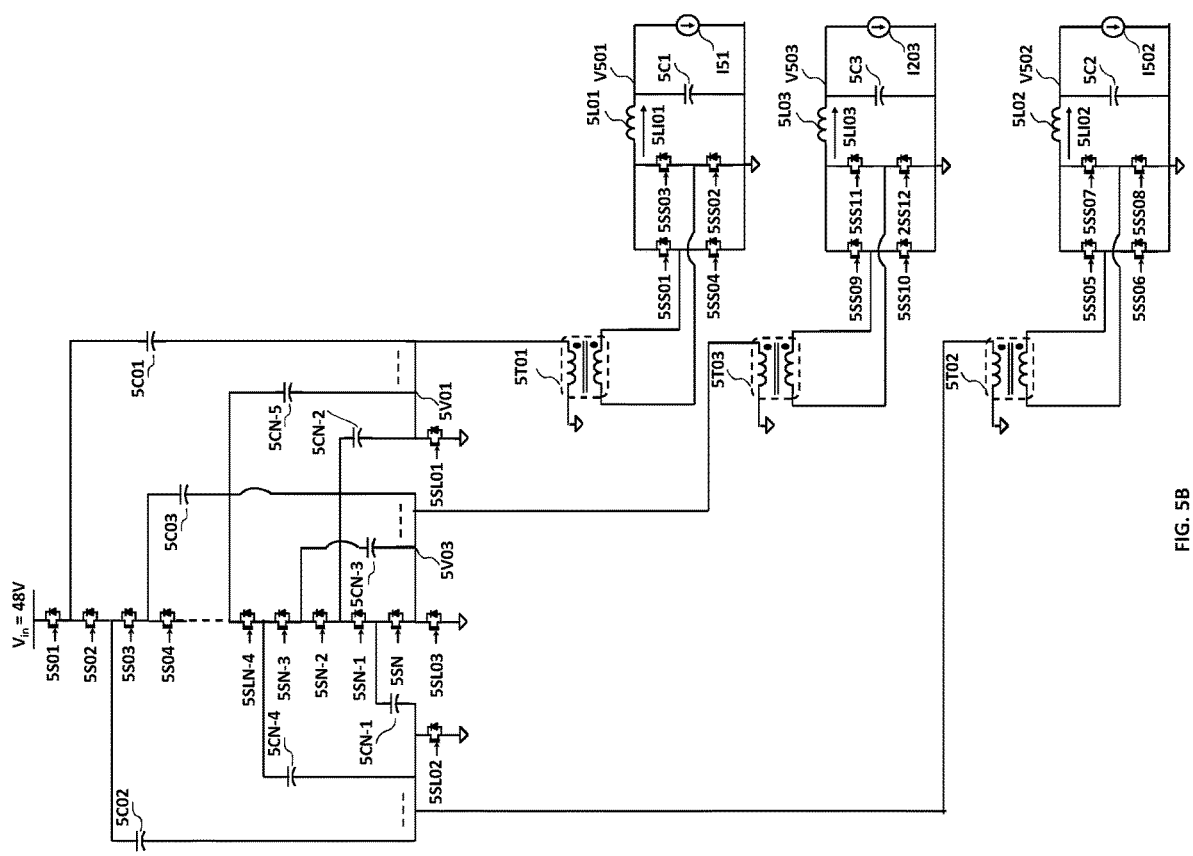
Figure 5C:
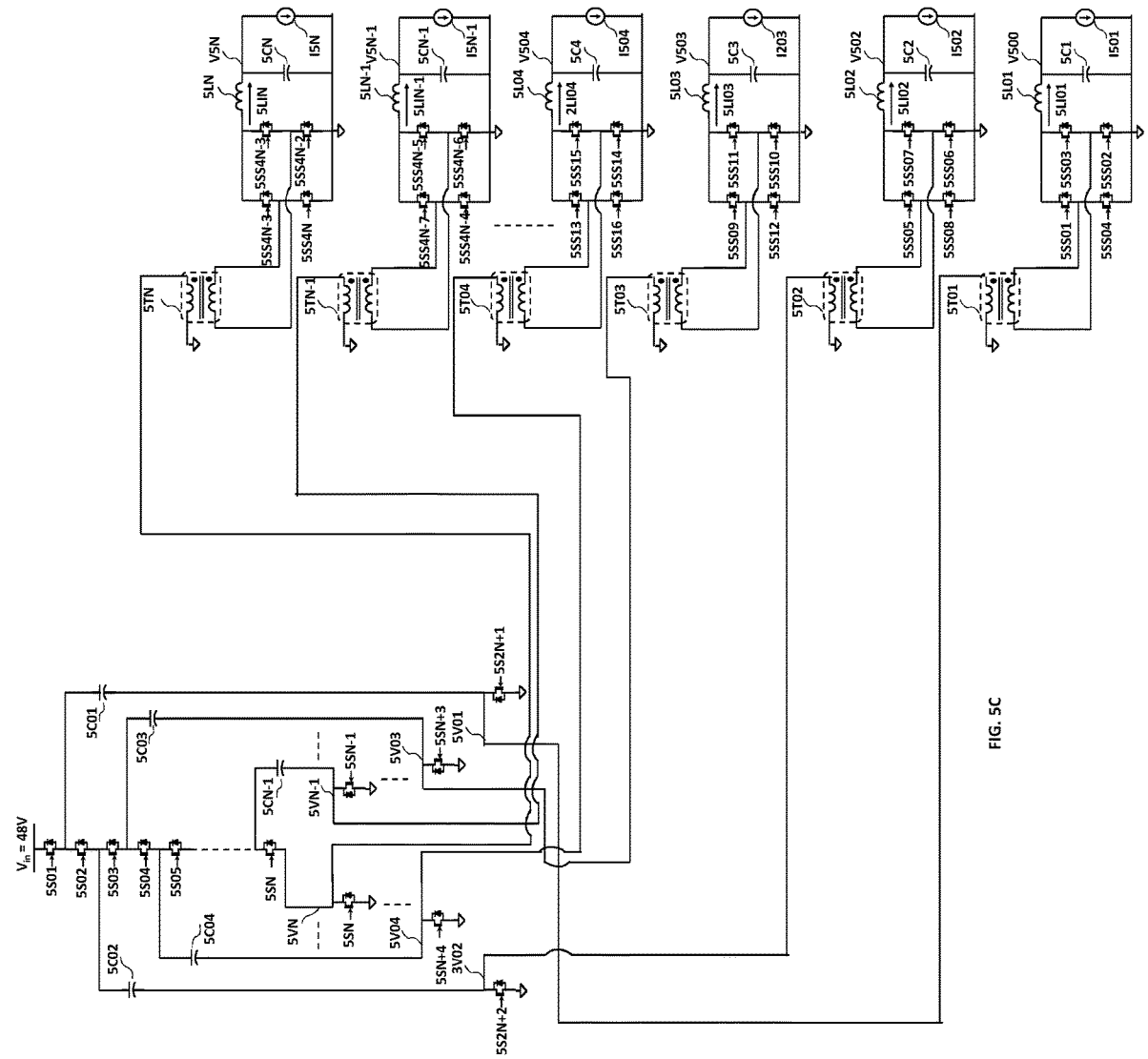

FIGS. 5A through 5C show further example embodiments of a multi-output DC-DC converter where an inductive network is be implemented using transformers followed by a synchronous rectifier stage. FIG. 5A, for example, shows an example embodiment of a two-phase version using two transformers and two synchronous rectification stages; FIG. 5B shows an example embodiment of a three-phase version using three transformers and three synchronous rectification stages, and FIG. 5C shows an example general N-phase embodiment of a multi-output hybrid converter using N transformers and N synchronous rectification stages.

Figure 6A:
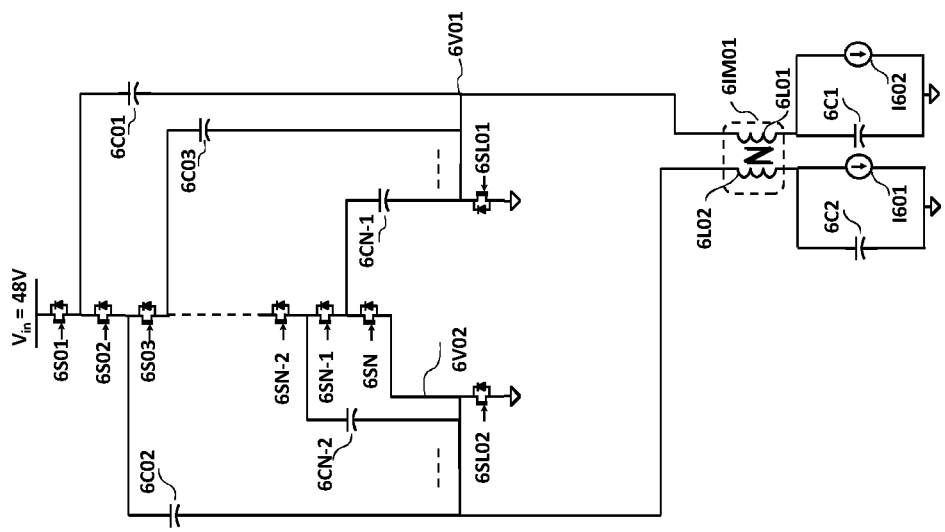
FIGS. 6A through 6C are schematic diagrams of example embodiments of a multi-output DC-DC converter where an inductive network is implemented using inductors that are coupled together with fewer magnetic cores to save overall implementation space and cost.
Figure 6B:
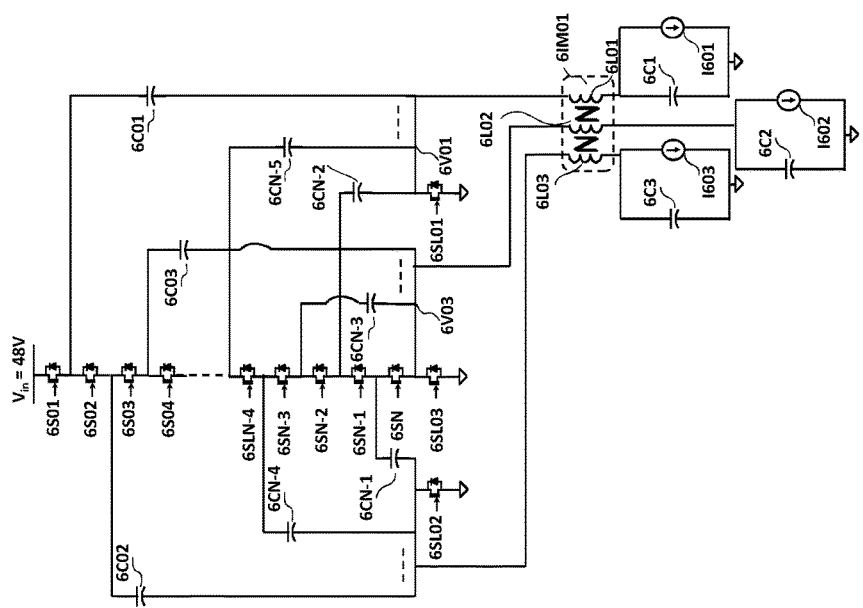
Figure 6C:
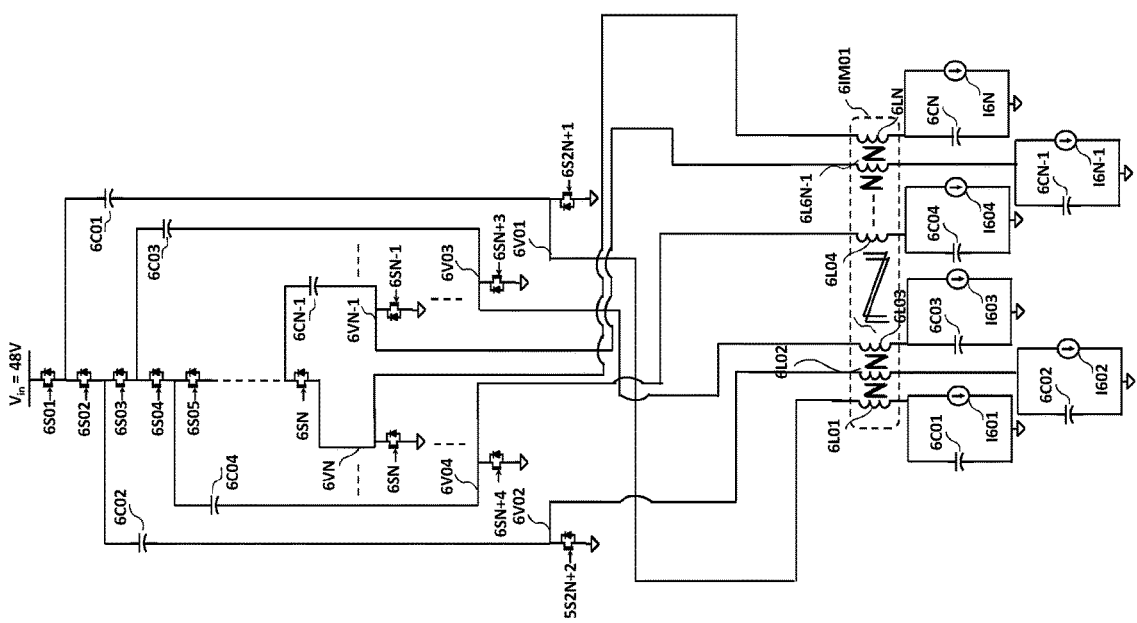

FIGS. 6A through 6C are schematic diagrams showing further example embodiments of a multi-output DC-DC converter in which an inductive network has inductors coupled together with fewer magnetic cores to save overall implementation space and cost. FIG. 6A, for example, shows an example embodiment of a multi-output DC-DC converter including a two-inductor coupling using two inductors; FIG. 6B shows an example embodiment of a multi-output DC-DC converter including a three-inductor coupling using three inductors; and FIG. 6C shows an example embodiment of a multi-output DC-DC converter including a general N-inductor coupling using N inductors.

Although implementations have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:
1. A voltage regulator comprising:
a switched capacitor network, wherein the switched capacitor network comprises:
a set of consecutive main network switches, the set of consecutive main network switches driven by multiple phases of pulse-width modulation (PWM) signals, wherein:
a controller is configured to drive the multiple phases of the PWM signals such that no two consecutive switches in the set of consecutive main network switches receive overlapping ON time from the PWM signals;
a first lower level switch connected directly to ground and a second lower level switch connected directly to ground, wherein:
the controller is configured to drive the first lower level switch with an inverse of a first phase of the multiple phases of the PWM signals and to drive the second lower level switch with an inverse of a second phase of the multiple phases of the PWM signals,
a first terminal of a final switch in the set of consecutive main network switches is connected to a first terminal of the first lower level switch through a first capacitor, and a second terminal of the final switch in the set of consecutive main network switches is directly connected to a first terminal of the second lower level switch; and a plurality of output filters connected to the set of consecutive main network switches, the plurality of output filters each comprising at least one inductor and at least one output capacitor, wherein the voltage regulator is configured to receive an input voltage at an input node connected to the switched capacitor network and to provide a plurality of relatively lower-level output voltages at a plurality of output nodes connected to the plurality of output filters.

2. The voltage regulator as recited in claim 1, wherein the switched capacitor network further comprises a different capacitor being connected between each switch within the set of consecutive main network switches.

3. The voltage regulator as recited in claim 1, wherein the first terminal of the final switch in the set of consecutive main network switches connects to a first inductor through the first capacitor.

4. The voltage regulator as recited in claim 3, wherein:
the second terminal of the final switch in the set of consecutive main network switches connects directly to a second inductor.

5. The voltage regulator as recited in claim 4, wherein:
the first inductor only connects to the set of consecutive main network switches through one or more capacitors.

\* \* \* \* \*